United States Patent [19]

Cowley et al.

[11] Patent Number: 4,863,143

[45] Date of Patent: Sep. 5, 1989

[54] SOLENOID ACTUATOR

[75] Inventors: Barry S. Cowley, Newmarket; George V. Calvert, Keighley, both of England

[73] Assignee: PED Limited

[21] Appl. No.: 38,015

[22] Filed: Apr. 14, 1987

[30] Foreign Application Priority Data

Apr. 17, 1986 [GB] United Kingdom ................. 8609464

[51] Int. Cl.[4] .......................... F16K 31/06; H01F 1/16

[52] U.S. Cl. ................................ 251/129.15; 335/260; 239/585; 137/328; 123/198 DB; 29/602.1

[58] Field of Search .................... 251/129.15; 335/260; 239/585; 137/328; 123/198 DB; 29/602.1

[56] References Cited

U.S. PATENT DOCUMENTS

| | | | |
|---|---|---|---|
| 3,307,129 | 2/1967 | Mangiafico | 335/260 X |
| 4,083,346 | 4/1978 | Eheim | 123/198 DB |
| 4,540,154 | 9/1985 | Kolchinsky | 251/129.15 |
| 4,597,558 | 7/1986 | Hafner | 251/129.15 |

*Primary Examiner*—Arnold Rosenthal

*Attorney, Agent, or Firm*—Oldham & Oldham Co.

[57] ABSTRACT

A solenoid actuator has an external casing comprising a part 16 mechanically drawn from a mild steel work piece and a second part in the form of a machined, screw threaded bush 20 welded to the drawn part 16. The part 16 is mechanically drawn to incorporate means such as a nut 18 by which the actuator can be threaded in to engagement with a complementary structure. In the case of a diesel engine, for example, the actuator may form a fuel cut off valve when mounted to the diesel engine valve casting.

9 Claims, 1 Drawing Sheet

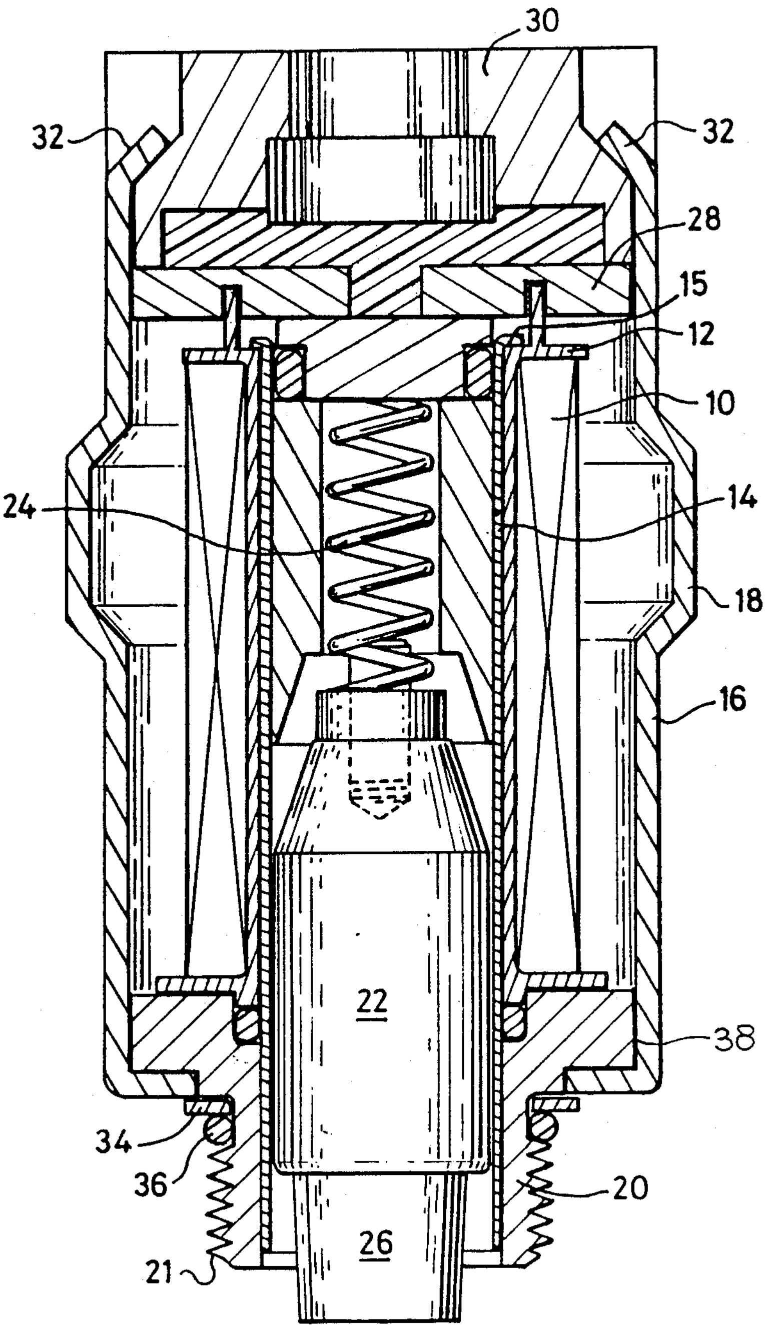
30
32
32
28
15
12
10
24
14
18
16
22
38
34
36
20
26
21

SOLENOID ACTUATOR

DESCRIPTION

1. Field of the Invention

This invention relates to a solenoid actuator and more particularly to the external casing of a solenoid actuator of the kind which has an external casing incorporating an integral means for engagement by a tool to enable attachment and detachment of the actuator from a separate structure. The invention also relates to a method of producing such an external casing for a solenoid actuator.

1. Background to the Invention

Solenoid actuators of the above described kind are known wherein the external casing having the tool engagement means is produced by machining from a solid work piece such as a bar or rod, usually made of a metal such as mild steel. The machining operation requires a number of steps, including turning, milling and screw threading, thus contributing disproportionately to the overall manufacturing cost of the actuator.

It is a primary object of this invention to enable high volume production of a solenoid actuator at reduced cost, when compared with the known manufacturing technique.

THE INVENTION

According to one aspect of the invention, there is provided a solenoid actuator of the above described kind wherein at least that part of the external casing having the integrally formed means for tool engagement is a drawn metal compartment.

Typically the casing is manufactured from a metal work piece by a mechanical drawing operation.

The casing is preferably formed in at least two parts, one constituted by said mechanically drawn part. The second part is preferably fixedly attached to the mechanically drawn part and adapted for mounting to the separate structure. Said second part is preferably manufactured by machining, and may comprise a screw threaded bush.

The casing work piece is preferably of mild steel and likewise the second part, the two parts being fixedly attached to one another by welding.

In an embodiment, the tool engagement means integral with the drawn part is a shaped head or nut for engagement by a spanner, the casing being adapted for screw threaded attachment and detachment from the separate structure.

The said drawn part of the casing is preferably lined with metal sleeve receiving the solenoid armature as a sliding fit therein.

The actuator may have a valve head for co-operation with a valve seat in the separate structure when the casing is attached to the said structure. The structure may be for example a diesel engine, the said valve head and valve seat constituting a fuel cut off valve. The valve head will be driven by the aforementioned armature of the actuator.

According to another aspect of the invention, there is provided a method of producing an external casing for a solenoid actuator of the kind described, according to which a first casing part incorporating the tool engagement means is produced by a mechanical drawing operation, a second part of the casing incorporating means for mounting to the separate structure is produced by machining, and the two casing parts are fixedly attached to one another. Preferably, the first part is mechanically drawn from the mild steel work piece, the second part is machined from a mild steel work piece, and the two parts are fixedly attached to one another by welding. The mechanical drawing operation may include the step of forming the tool engagement means as a head or nut for engagement by a spanner and the machining operation may include the step of forming a screw thread on the second part.

DESCRIPTION OF EMBODIMENT

A practical embodiment of solenoid actuator having an external casing in accordance with the invention is shown in the accompanying drawing, in which the single FIGURE shows the actuator in axial cross-section.

Referring to the drawing, the actuator comprises an energisation coil 10 wound upon a bobbin 12 lined with a brass sleeve 14 in which the armature 22 is a sliding fit in the axial direction. The brass lining sleeve 14 has a rim 15 at one end at which it is axially located against the corresponding end of the bobbin 12.

An external casing has a first part 16, mechanically drawn from a mild steel workpiece, and incorporating an integral hexagonal nut or head 18, and a second part, machined from a mild steel solid work piece, in the form of a screw threaded bush 20. The bush 20 is fixedly attached to one end of the casing part 16 as shown at 38, which will be the lower end as drawn, by projection welding.

The bobbin 12 seats between the bush 20 at the lower end and a bridge piece 28 at the upper end. Said bridge piece 28 is held down by a terminal block 30 in turn retained in the casing part 16 by tongue portions 32.

At the lower end a washer 34 and O-ring seal 36 are mounted around the neck of the bush 20, above the screw threaded portion 21 thereof.

The armature carries a valve head 26 projecting from the lower end of the bush 20 and is normally urged downwardly by a coil spring 24. Valve head 26 is lifted when the coil 10 is energised to displace the armature upwardly against the action of the spring 24.

In accordance with the invention, the casing part 16 is a drawn metal compartment, mechanically drawn from a work piece in the form of a mild steel disc or ring, conveniently about 1 mm thick and of approximately 23 mm radius, to produce a cavity which is 40 mm by 23 mm diameter with a 24 mm AF hexagonal nut profile.

The washer 34 is preferably made of aluminium alloy, and covers any sputter resulting from the step of welding the machined bush 20 to the casing part 16, thereby to prevent damage to the O-ring seal 36.

In use, the actuator is mounted to a separate structure (not shown) having a complementary tapped aperture to receive the screw threaded bush 20, using a spanner or like tool on the nut 18 to effect the mounting operation. When the actuator is mounted in position, the washer 34 tightly engages the face of the separate struture, the O-ring 36 providing a liquid-tight seal. In this mounted position on the valve head 26 is urged by the spring 24 into sealing engagement with a valve seat in the separate structure, thereby to form a normally closed valve.

The interior of the actuator is filled with a polyurethane resin encapsulant to protect the actuator from possible damage due to penetration of fluids, as for example when the actuator in situ ser.ves as a fuel cut off valve for a diesel engine constituting the separate structure.

The ability of the actuator to operate in the region of up to 200° C. is assisted firstly by design of the coil 10 with minimum thickness, maximum length and thereby a maximum surface area for the escape of heat; secondly by the polyurethane encapuslant which permits a more ready transmission of heat to the casing part 16 than would alternative encapuslants such as silicon rubber or epoxy resin; and thirdly by maximising heat transfer from the casing part 16 to the complementary structure, such for example as a diesel engine valve casting, by means of the aluminium alloy washer 34.

The above described embodiment may be modified in various ways within the scope of the invention defined by the appended claims. In particular the bush 20 may be braized or soldered to the casing 16.

We claim:

1. A solenoid actuator including an external casing formed in at least two parts and comprising:

a first part constituted by a metal compartment drawn from a work piece and having an integrally formed means for engagement by a tool; and a second machined part fixed to said metal compartment and adapted for mounting to a separate structure to enable attachment and detachment of the actuator from said separate structure by application of the tool to said integrally formed means on the first part.

2. An actuator according to claim 1, wherein said second part is a screw threaded bush.

3. A actuator according to any claim 1 wherein said work piece is a mild steel disc or ring.

4. An actuator according to claim 3 wherein said second part is of mild steel and is welded to said drawn part.

5. An actuator according to of claim 4, wherein said tool engagement means integral with said drawn part is a shaped head or nut for engagement by a spanner or like tool, the casing being adapted for screw threaded attachment to and detachment from a separate structure.

6. The actuator according to claim 1 wherein said metal compartment of said casing is lined with a metal sleeve receiving the solenoid armature as a sliding fit therein.

7. A method of producing an external casing for a solenoid actuator of the kind described, according to which a first casing part incorporating the tool engagement means is produced by a mechanical drawing operation, a second part of the casing incorportating means for mounting to the separate structure is produced by machining, and the two casing parts are fixedly attached to one another.

8. A method according to claim 7, wherein the first part is mechanically drawn from a mild steel work piece, the second part is machined from the mild steel work piece and the two parts are fixedly attached to one another by welding.

9. A method according to claim 8, wherein the mechanical drawing operation includes the step or forming the tool engagement means as a head or nut for engagement by a spanner or like tool and the machining operation includes the step of forming screw thread on the second part.

* * * * *